United States Patent [19]
Becker

[11] 3,807,522
[45] Apr. 30, 1974

[54] SEAT BELT RETRACTOR

[75] Inventor: Joseph F. Becker, Ballwin, Mo.

[73] Assignee: Irvin Industries Inc., Greenwich, Conn.

[22] Filed: Dec. 30, 1971

[21] Appl. No.: 214,071

[52] U.S. Cl. ..... 180/82 C, 242/107 SB, 280/150 SB, 297/388
[51] Int. Cl. ............................................. A62b 35/00
[58] Field of Search .................. 180/82 C, 103, 104; 280/150 SB; 297/388; 242/107 SB

[56] References Cited
UNITED STATES PATENTS

| | | |
|---|---|---|
| 3,659,801 | 10/1970 | Romanzi ....................... 280/150 SB |
| 3,550,875 | 12/1970 | Settimi .......................... 280/150 SB |
| 3,311,188 | 3/1967 | Gutshall ............................. 180/104 |
| 3,392,726 | 12/1966 | Jette ................................... 180/104 |
| 3,371,736 | 3/1968 | Lewis et al. .................... 280/150 SB |
| 3,491,966 | 1/1970 | Curran et al. ................. 280/150 SB |
| 2,883,123 | 4/1959 | Finnigan ....................... 280/150 SD |
| 3,240,510 | 3/1966 | Spouge ............................. 180/82 C |

*Primary Examiner*—Philip Goodman
*Assistant Examiner*—John A. Carroll
*Attorney, Agent, or Firm*—Browne, Beveridge, DeGrandi & Kline

[57] ABSTRACT

A vehicle seat belt retractor including an electrically operated stop means actuable by a sensor responsive to sudden changes in vehicle movement.

9 Claims, 14 Drawing Figures

INVENTOR
Joseph F. Becker
BY Rommel and Rommel
ATTORNEYS

INVENTOR
Joseph F. Becker
BY Rommel and Rommel
ATTORNEYS

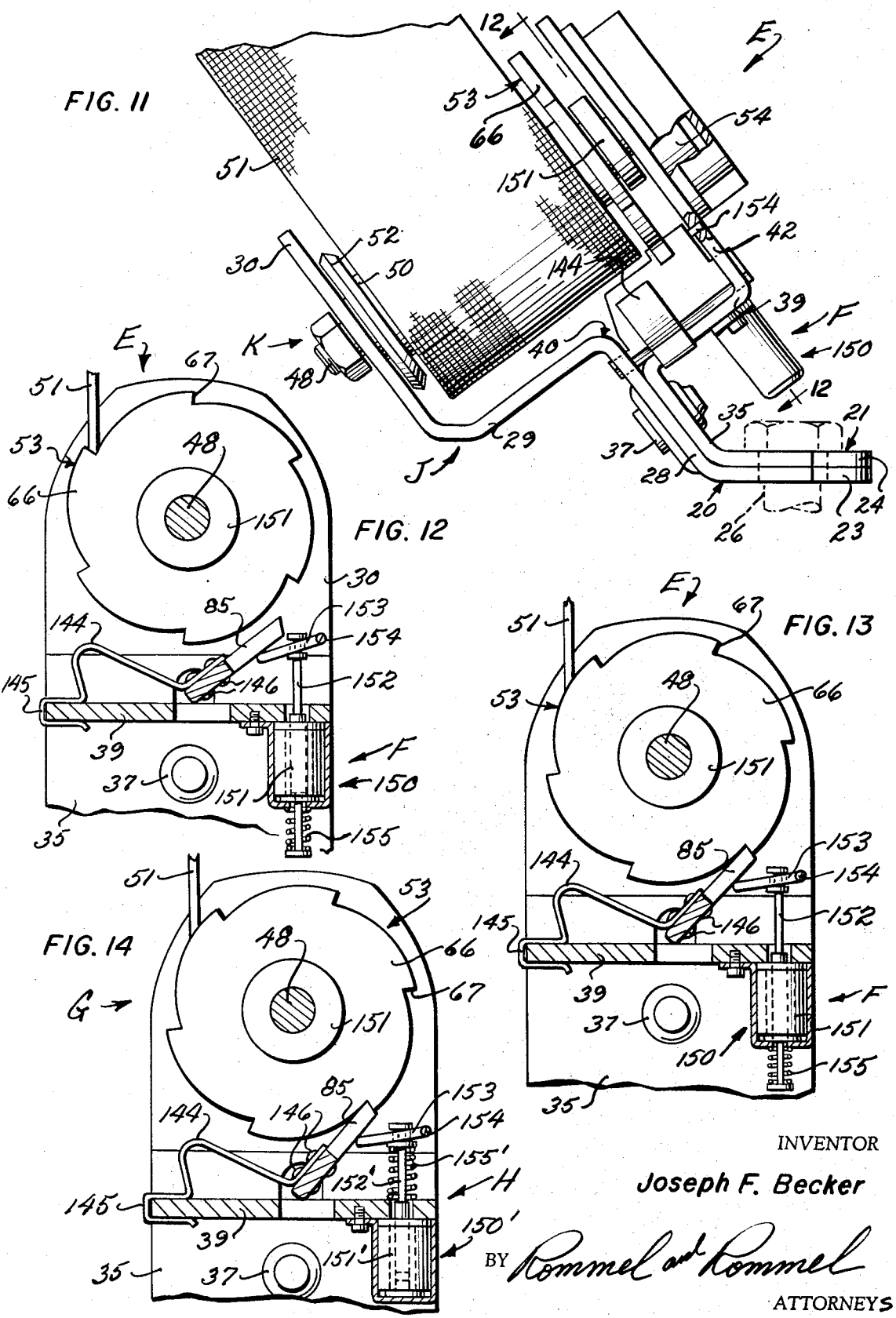

SEAT BELT RETRACTOR

This invention relates to improvement in vehicle seat belt retractors.

It is the primary object of this invention to provide a vehicle seat belt retractor from which the belt may be normally unwound on demand, and including electrically operated stop means for limiting protraction of the belt from the retractor under certain conditions. The electric circuit including the electrically operated stop means also preferably includes sensor means for operation of the electrically operated stop means of the retractor to prevent further protraction of the belt from the retractor in response to sudden changes in vehicle movement.

Other objects and advantages of the invention will become apparent during the course of the following detailed description, taken in connection with the accompanying drawings, forming a part of this specification, and in which drawings:

FIG. 11 is a front view of a further modified form of retractor.

FIG. 12 is a sectional view taken substantially on the line 12—12 of FIG. 11.

FIG. 13 is a view similar to FIG. 12, showing the retractor in a different stage of operation.

FIG. 14 is a view similar to FIG. 13, but showing a modified form of electrically operated stop means.

Figure 1:
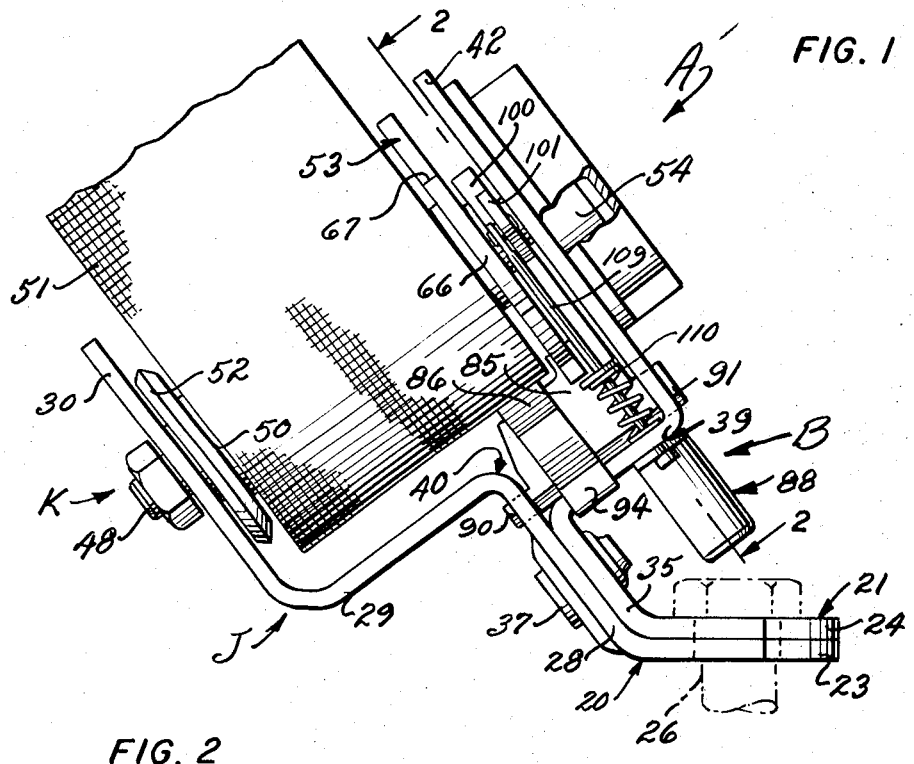
FIG. 1 is a front view of one form of my improved retractor.
Figure 2:
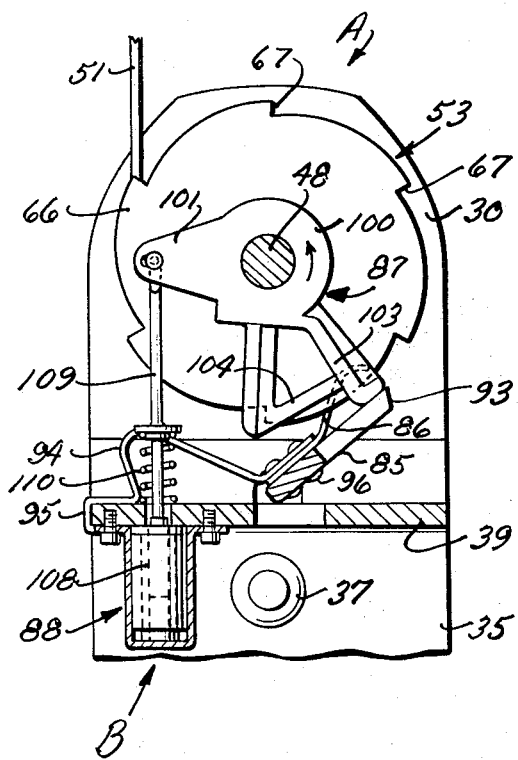
FIG. 2 is a sectional view taken substantially on the line 2—2 of FIG. 1.
Figure 3:
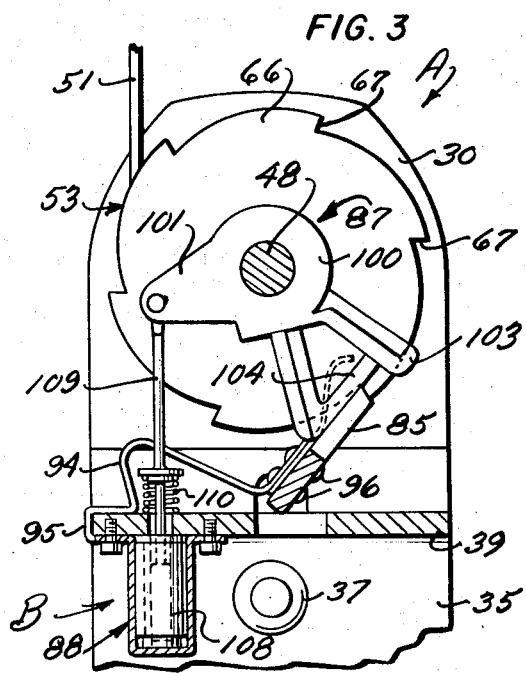
FIG. 3 is a view similar to FIG. 2, but showing a different stage of operation thereof.
Figure 7:
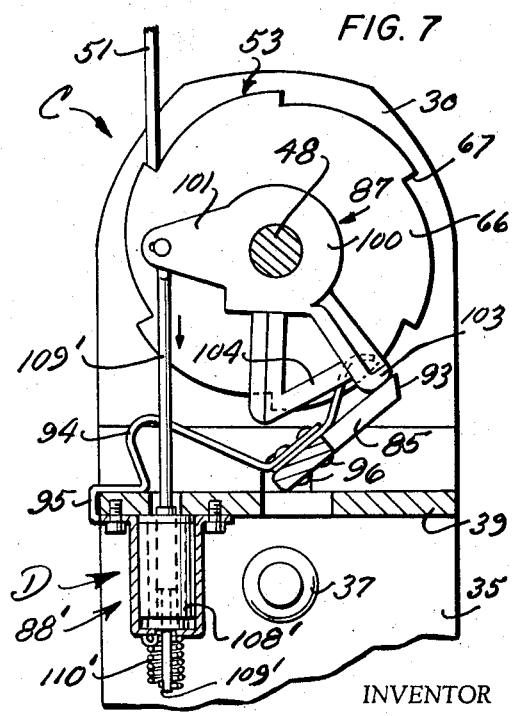
FIG. 7 is a view similar to FIG. 2, but showing a modified form of electrically operated stop means.

In the drawings, wherein for the purpose of illustration is shown a preferred embodiment of the invention, and wherein similar reference characters designate corresponding parts through the several views, the letter A may generally designate the retractor as shown in FIGS. 1-3, including electrically operated stop means B; C the retractor as shown in FIG. 7, including electrically operated stop means D; E the retractor as shown in FIGS. 11-13, including electrically operated stop means F; and G the retractor as shown in FIG. 14, including electrically operated stop means H. All forms of the invention may include generally identical frames J and reel units K, and identical reference characters have therefore been applied to the same.

Frame J, as best shown in FIGS. 1 and 11, preferably comprises a pair of bracket sections 20 and 21 having respective lower portions 23 and 24 which may receive a bolt or other fastener 26 for attachment of the retractor to a vehicle.

Bracket 20 has an upwardly angled leg 28 extending from lower portion 23 thereof, a portion 29 extending downwardly at substantially a 90° angle from the uppermost end of leg 28, and an upstanding flange portion 30 extending at substantially a 90° angle upwardly from the lowermost end of portion 29.

Bracket member 21 preferably includes a leg portion 35 extending angularly upwardly from lower portion 24, the same overlying and being in abutment with leg portion 28 of bracket member 20. Bracket members 20 and 21 may be attached together such as by a rivet or other fastener 37 interconnecting their respective leg portions 28 and 35. Extending from the uppermost end of leg portion 35 may be an upwardly and outwardly extending portion 39, extending away from leg portion 28 of bracket 20 intermediate the leg thereof, and providing a channel 40 within which may be mounted the respective stop means B, D, F and H, as will be subsequently described. Flange portion 42 of bracket member 21 extends from the outermost end of portion 39. Flange portions 30 and 42 comprise spaced apart flanges for receiving therebetween reel unit K, as will be subsequently described.

Reel unit K is substantially identical to that disclosed in the copending application of Louis Romanzi, Jr., Ser. No. 3,087, filed Jan. 15, 1970. It may include a rotatable shaft 48 on which may be mounted a tubular hub 50 on which belt 51 may be wound between end members 52 and 53, spring means 54 being provided to bias the same in a direction for rewind of belt 51 thereon.

End member 53 preferably comprises a ratchet wheel 66 having a plurality of teeth 67 about the periphery thereof, and which forms a part of respective stop means B, D, F and H, as will be subsequently described. Ratchet wheel 66 thus comprises means interconnected with the reel and operable for preventing protraction of belt from the reel, as will be subsequently described.

Step means B preferably includes ratchet wheel 66, a pawl 85, belt follower means 86 being mounted on pawl 85, clutch means 87, and solenoid means 88.

Pawl 85 preferably comprises a somewhat elongated body portion having endmost extensions 90 and 91 for pivotal support thereof in channel 40, and having an end 93 which may engage teeth 67 of ratchet wheel 66. Spring means 94 preferably include a substantially U-shaped clamping portion 95 for attachment thereof to frame J, the other end thereof being attached to pawl 85 such as by the same rivets 96 which may also secure belt follower 86 to pawl 85. In this form of the invention, spring means 94 comprises means for urging pawl 85 into engagement with ratchet wheel 66.

As shown, belt follower means 86 is provided for abutment with belt 51 when the same is substantially fully wound on reel unit K, in a manner to hold pawl 85 away from ratchet wheel 66.

Clutch means 87 preferably includes a body portion 100 which is rotatably mounted on shaft 48. Body portion 100 preferably includes a clevis portion 101, a first portion 103 and a second portion 104.

First portion 103 is preferably positioned for manipulative blocking action of pawl 85 with ratchet wheel 66 to permit free protraction and retraction of the belt.

Second portion 104 is provided for manipulative rotative action to permit abutment and locking action of pawl 85 with ratchet wheel 66 to prevent further protraction of belt 60 on operation of the stop means.

Solenoid means 88 preferably includes a conventional solenoid 108 having a vertically reciprocable plunger 109, the outer end of which may be pivotally attached adjacent the outer end of clevis 101. Solenoid 108 is preferably a pull type solenoid, spring means 110 being provided on vertical plunger 109 to hold the same in a normally extended position when solenoid 108 is not activated.

Figure 4:
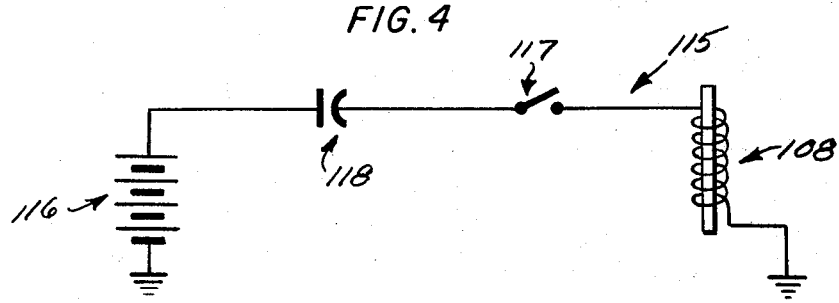
FIG. 4 is a schematic showing one form of electric circuit which may be used in connection with my retractor.

As shown in FIG. 4, solenoid 108 may be interconnected to an electric circuit 115, which may also include an electric supply means 116, such as a battery, and a switch means 117. A capacitor 118 may also be provided for building up current for simultaneous discharge to solenoid 108 upon closure of switch means 117.

Figure 5:
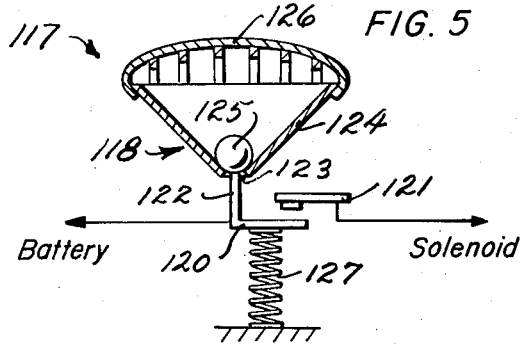
FIG. 5 is a sectional view showing a type of sensor means which may be used as a switch means of an electric circuit for operation of my retractor.
Figure 6:
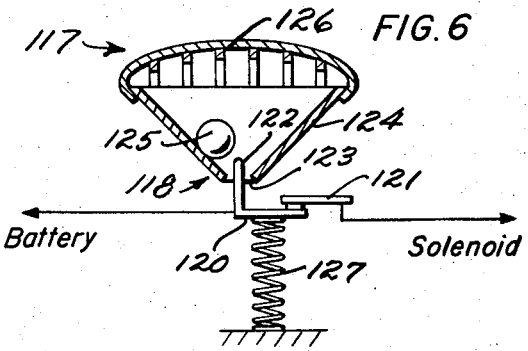
FIG. 6 is a view similar to FIG. 5 showing the sensor means thereof in a different position of operation.

As shown in FIGS. 5 and 6, switch means 117 is preferably normally open and may comprise a sensor means 118. Sensor means 118 may be of any conventional type, the type shown in the drawing merely being by way of example. In the form shown, sensor means 118 may include a pair of switch contact arms 120 and 121, switch contact arm 120 including an upstanding flange portion 122 which may be received through an opening 123 of a cone-like member 124. A ball member 125 may be received within cone member 124, being retained therewithin such as by a cage member 126. This is a normally open switch means in which, on occasion of a sudden change in vehicle movement, will enable ball 125 to roll up on the side of cone member 124, as shown in FIG. 6, spring means 127 urging contact arm 122 upwardly and causing at least momentary contact of arms 120 and 121, thus closing switch means 117 to permit electrical discharge to solenoid 108 for activation thereof.

Vertical plunger 109 of solenoid 108 will normally be extended by spring means 110 in the position as shown in FIG. 2. Assuming that belt 51 has been at least partially unwound from reel unit K, about an occupant of the vehicle, then upon a sudden change of movement of the vehicle, switch means 117 will be closed, as previously described, which will activate solenoid 108, pulling vertical plunger 109 downwardly, against the action of spring 110, which moves clutch means 87 to the position as shown in FIG. 3, which moves portion 103 of clutch means 87 out of the way of pawl 85 so that the same may move into engagement with a tooth 67 of ratchet wheel 66, preventing further protraction of belt 51 from reel unit K.

When the seat belt buckle is released from about an occupant, and the retractor is permitted to retract belt 51, the retraction of belt about reel unit K builds up to a point to cause abutment of the same with belt follower means 86, which moves pawl 85 away from ratchet wheel 66 and permits first portion 103 of clutch means 87 to move into abutment therewith. Switch means 117 having been opened by this time, spring means 110 will urge vertical plunger 109 upwardly to rotate clutch means 87 so that leg portion 103 thereof moves into engagement with pawl 85 again, as shown in FIG. 2.

Retractor C and electrically operated stop means D thereof are respectively quite similar to retractor A and electrically operated stop means B thereof. Insofar as the same are identical, identical reference characters have been applied.

About the only difference between electrically operated stop means B and electrically operated stop means D is that solenoid means 88' of stop means D preferably includes a push type solenoid 108'. Solenoid 108' is preferably provided with a vertically reciprocal plunger 109', the outer end of which may be pivotally attached adjacent the outer end of clevis 101. Spring means 110' is provided to hold vertical plunger 109' in a normally retracted position when solenoid 108' is not activated.

Figure 8:
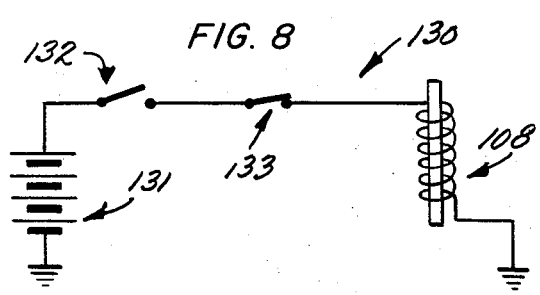
FIG. 8 is a schematic showing another form of electric circuit which may be used in connection with my electrically operated stop means.

As shown in FIG. 8, solenoid 108' may be interconnected to an electric circuit 130, which may also include an electric supply means 131, such as a battery, a first switch means 132 and a second switch means 133.

As shown, first switch means 132 is normally open and second switch means 130 is normally closed. First switch means 132 is preferably located in the vehicle so that the same will be closed upon vehicle occupancy. It may, for instance, be an adjunct of the ignition switch, or may be a pressure operated switch that is closed when the driver sits on his seat.

Figure 9:
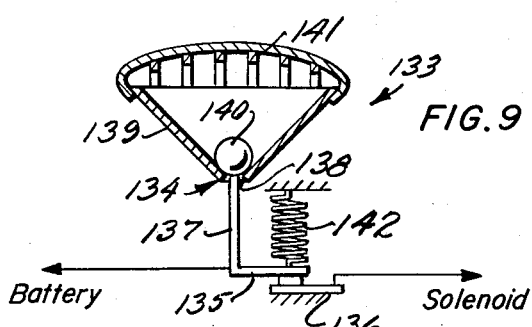
FIG. 9 is a sectional view showing a sensor means which may be used in the electric circuit of FIG. 8.
Figure 10:
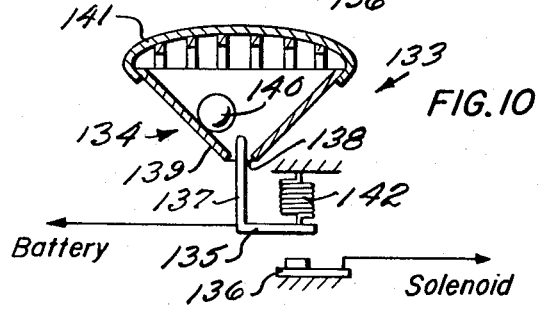
FIG. 10 is a view similar to FIG. 9, showing the sensor means thereof in a different stage of operation.

As shown in FIGS. 9 and 10, switch means 133 is preferably closed and may comprise a sensor means 134. Sensor means 134 may be of any conventional type, the type shown in the drawing merely being by way of example. In the form shown, sensor means 134 may include a pair of switch contact arms 135 and 136, switch contact arm 135 including an upstanding flange portion 137 which may be received through an opening 138 of a cone-like member 139. A ball member 140 may be received within cone member 139, being retained therewithin such as by a cage member 141. This is a normally closed switch means in which, on occasion of a sudden change in vehicle movement will enable ball 140 to roll up on the side of cone member 139, as shown in FIG. 10, spring means 142 pulling contact arm 135 upwardly and away from contact arm 136, causing at least momentary opening of switch means 133, thus interrupting electrical circuit 130 and deactivating solenoid 108'.

Vertical plunger 109' of solenoid 108' is normally extended when solenoid 108' is activated, as shown in FIG. 7. Assuming the belt 51 has been at least partially unwound from reel unit K, about an occupant of the vehicle, then upon a sudden change of movement of the vehicle, switch means 133 will be opened, as previously described, which will deactivate solenoid 108', spring means 110' pulling vertical plunger 109' downwardly, which moves first portion 103 of clutch means 87 out from behind pawl 85 and permits the same to engage ratchet wheel 66, preventing further protraction of belt 51 from reel unit K.

When the seat belt buckle is released from about an occupant, and the retractor is permitted to retract belt 51, the retraction of belt about reel unit K builds up to a point to cause abutment of the same with belt follower means 86, which moves pawl 85 away from ratchet wheel 66 and permits first portion 103 of clutch means 87 to move into abutment therewith. Switch means 133 having been closed by this time, and solenoid 108' thus activated, solenoid 108' will urge vertical plunger 109' upwardly to rotate clutch means 87 so that leg portion 103 thereof moves into engagement with pawl 85 again, as shown in FIG. 7.

For the purposes of simplicity I have shown only a single retractor as actuable by the schematics of FIGS. 4 and 8. It is believed that it would be obvious to one skilled in the art to provide interconnection of the electrically operated stop means of a plurality of retractors in similar electric circuits.

Stop means F of retractor E preferably includes ratchet wheel 66, a pawl 85 and solenoid means 150. As previously described, frame J and reel unit K is substantially identical to that previously described in connection with retractor A and, in order to take up the space on reel unit K that would normally be occupied by clutch means 87 of form A, a washer 151 may be mounted on shaft 48.

Pawl 85 is identical to that previously shown and described in connection with retractor A and identical reference characters have been applied thereto. Spring means 144 preferably includes a substantially U-shaped clamping portion 145 for attachment thereof to frame J, the other end thereof being attached to pawl 85 such as by rivets 146. In this form of invention, spring means 144 comprises means to urge pawl 85 away from engagement with ratchet wheel 66.

Solenoid means 150 preferably includes a conventional solenoid 151 having a vertically reciprocable plunger 152, the outer end of which may be attached to an arm 153. Arm 153 preferably has one end 154 thereof pivotally attached to flange 42, as shown in FIG. 11, the other end thereof engaging pawl 85 as a lever means for movement thereof. Solenoid 151 is preferably a push type solenoid, in which vertical plunger 152 thereof is in a retracted position when solenoid 151 is not activated, as shown in FIG. 12, spring means 155 pulling vertically reciprocable plunger 152 downward, and is in an extended position on activation of solenoid 151, as shown in FIG. 13. Solenoid 151 may be substituted in place of solenoid 108 in the electric circuit 115, as shown in FIG. 4.

In operation, vertical plunger 152 of solenoid 151 will normally be retracted on when solenoid 151 is not activated, so that pawl 85 may assume the position as shown in FIG. 12. As previously described, upon sudden change of movement of the vehicle, switch means 117 will be closed, activating solenoid 151, urging vertical plunger 152 upwardly, thus pivoting lever means 153 against pawl 85 and moving the same and into engagement with ratchet wheel 66.

After the critical condition of sudden movement has passed, switch means 117 will open, again deactivating solenoid 151, and spring means 155 will pull lever means 153 downwardly so that spring means 144 will cause pawl 85 to assume the position as shown in FIG. 12.

Retractor G, as shown in FIG. 14, is substantially identical to that of form E. The only difference is in the operation of the electrically operated stop means H.

Insofar as electrically operated stop means H is identical to electrically operated stop means F, identical reference characters have been applied.

Solenoid means 150' of electrically operated stop means H preferably comprises a pull type solenoid 151', having a vertically reciprocable plunger 152', the outer end of which may be attached to lever arm 153. Since solenoid 151' is preferably a pull type solenoid, spring means 155' is provided on vertically reciprocable plunger 152 to hold the same in a normally extended position when solenoid 151' is not activated. Solenoid 151' may be substituted for solenoid 108' in electric circuit 130 of FIG. 8.

Assuming that belt 51 has been at least partially unwound from reel unit K of retractor G, then upon a sudden change of movement of the vehicle, switch means 133 will be opened, as previously described, deactivating solenoid 151', so that spring means 155' will lift vertical plunger 152', urging lever arm 153 against pawl 85 to overcome the action of spring means 144, and moving pawl 85 into engagement with ratchet wheel 66, as shown in FIG. 14.

After the critical condition of sudden movement has passed, switch means 133 will have closed, again activating solenoid means 151', which will pull lever means 153 downwardly and permit spring means 144 to move pawl 85 away from engagement with ratchet wheel 66.

Various changes may be made in the forms of the invention herein shown and described without departing from the spirit of the invention or the scope of the following claims.

I claim:

1. A vehicle seat belt retractor including a frame, a reel rotatably mounted on said frame, a belt wound around said reel in a predetermined retracted position from which it is adapted to be unwound in protraction of said belt therefrom, means biasing said reel toward rewind rotation, said reel being normally rotatably for protraction of said belt from said reel on demand, electrically operated stop means having means interconnected with said reel and operable for preventing protraction of said belt from said reel, an electric circuit including electric supply means and sensor means for interconnecting said electric supply means and said electrically operated stop means for operation of said electrically operated stop means, said sensor means being responsive to sudden changes in vehicle movement for operation of said electrically operated stop means to prevent protraction of said belt from said reel under conditions of sudden change of vehicle movement, said means interconnected with said reel and operable for preventing protraction of said belt from said reel comprising a ratchet wheel mounted for rotatable movement with said reel, and said stop means includes a pawl mounted on said frame for engagement with said ratchet wheel in preventing rotation of said reel in a direction for protraction of belt from said reel, spring means urging said pawl into engagement with said ratchet wheel, clutch means including a first portion for locking engagement of said pawl with said ratchet wheel and a second portion which permits said pawl to engage said ratchet wheel, and solenoid means interconnected to said clutch means for operation of the same in moving said first portion thereof out of blocking engagement with said pawl.

2. A vehicle seat belt retractor as specified in claim 1 wherein said reel includes a shaft for rotatably supporting said reel on said frame and said clutch means includes a body portion, said first portion of said clutch means extending outwardly from said body portion for operable engagement with said pawl in blocking engagement thereof with said ratchet wheel, said clutch means being rotatably mounted on such shaft for rotatable movement thereof about such shaft in operably moving said first portion thereof into and out of blocking engagement with said pawl, and said solenoid is interconnected to said clutch means for operable rotation of said clutch means about said shaft.

3. A vehicle seat belt retractor as specified in claim 2 wherein said body portion of said clutch means includes clevis means extending outwardly from the axis of rotation thereof and said solenoid is operably interconnected thereto adjacent the outermost end of said clevis so that movement of said solenoid a relatively short distance is sufficient to operably rotate said clutch means about such shaft for engagement and disengagement thereof with said pawl means.

4. A vehicle seat belt retractor as specified in claim 1 wherein said means interconnected with said reel comprises a ratchet wheel mounted for rotatable movement with said reel, said stop means including a pawl mounted for engagement with said ratchet wheel in preventing rotation of said reel in a direction for protraction of belt from said reel and said sensor means comprises normally closed switch means adapted to open on sudden change in vehicle movement and interrupt said electric circuit for operation of said stop means for engagement of said pawl with said ratchet wheel in preventing protraction of belt from said reel.

5. A vehicle seat belt retractor as specified in claim 4 wherein said electric circuit includes a second switch means responsive to vehicle occupancy in completing said electric circuit.

6. A vehicle seat belt retractor as specified in claim 4 wherein said electric circuit includes a second switch means responsive to vehicle operation in completing said electric circuit.

7. A vehicle seat belt retractor as specified in claim 1 wherein said pawl includes belt follower means mounted thereon for abutting against the belt on said reel under conditions of substantially full rewind retraction and moving said pawl away from said ratchet wheel a sufficient distance to permit said first portion of said clutch means to move behind said pawl to abut said pawl and block engagement of said pawl with said ratchet wheel.

8. A vehicle seat belt retractor as specified in claim 1 wherein said sensor means comprises normally open switch means adapted to close on sudden change in vehicle movement and complete said electric circuit for activation of said solenoid means in movement of said clutch means to permit engagement of said pawl with said ratchet wheel.

9. A vehicle seat belt retractor as specified in claim 1 wherein said sensor means comprises normally closed switch means adapted to open on sudden change in vehicle movement and interrupt said electric circuit to permit operation of said solenoid means in movement of said clutch means to permit engagement of said pawl with said ratchet wheel.

* * * * *

UNITED STATES PATENT OFFICE
CERTIFICATE OF CORRECTION

PATENT NO. : 3,807,522
DATED : April 30, 1974
INVENTOR(S) : Joseph F. Becker

It is certified that error appears in the above-identified patent and that said Letters Patent are hereby corrected as shown below:

In the drawings, sheet 2, Fig. 4, should appear as follows:

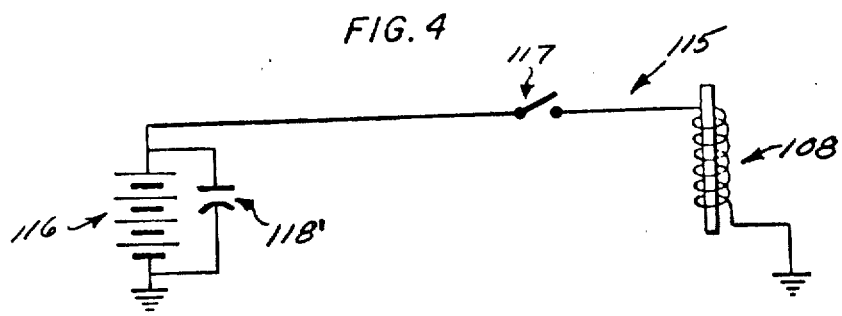

Column 3, line 16, the numeral "118" should be -- 118' --.

Signed and Sealed this

Twenty-sixth Day of April 1977

[SEAL]

Attest:

RUTH C. MASON
Attesting Officer

C. MARSHALL DANN
Commissioner of Patents and Trademarks